United States Patent [19]
Balakrishnan

[11] Patent Number: 5,995,328
[45] Date of Patent: *Nov. 30, 1999

[54] MULTI-LAYERED INTEGRATED CONDUCTOR TRACE ARRAY INTERCONNECT STRUCTURE HAVING OPTIMIZED ELECTRICAL PARAMETERS

[75] Inventor: Arun Balakrishnan, Lafayette, Colo.

[73] Assignee: Quantum Corporation, Milpitas, Calif.

[ * ] Notice: This patent is subject to a terminal disclaimer.

[21] Appl. No.: 09/056,893

[22] Filed: Apr. 6, 1998

Related U.S. Application Data

[63] Continuation-in-part of application No. 08/720,833, Oct. 3, 1996, Pat. No. 5,737,152.

[51] Int. Cl.⁶ .................................................... G11B 5/48
[52] U.S. Cl. ................................................................ 360/104
[58] Field of Search ...................................... 360/104, 108

[56] References Cited

U.S. PATENT DOCUMENTS

| | | | |
|---|---|---|---|
| 4,819,094 | 4/1989 | Oberg | 360/104 |
| 5,006,946 | 4/1991 | Matsuzaki | 360/104 |
| 5,034,091 | 7/1991 | Trask et al. | 156/643 |
| 5,196,377 | 3/1993 | Wagner et al. | 437/225 |
| 5,231,756 | 8/1993 | Tokita et al. | 29/830 |
| 5,391,842 | 2/1995 | Bennin et al. | 174/260 |
| 5,473,488 | 12/1995 | Gustafson et al. | 360/104 |
| 5,491,597 | 2/1996 | Bennin et al. | 360/104 |
| 5,519,552 | 5/1996 | Kohira et al. | 360/104 |
| 5,528,819 | 6/1996 | McKay et al. | 360/104 |
| 5,530,604 | 6/1996 | Pattanaik | 360/104 |
| 5,539,596 | 7/1996 | Fontana et al. | 360/106 |
| 5,597,496 | 1/1997 | Masaichi et al. | 360/104 |
| 5,694,270 | 12/1997 | Sone et al. | 360/104 |
| 5,717,547 | 2/1998 | Young | 360/104 |
| 5,754,369 | 5/1998 | Balakrishnan | 360/104 |
| 5,812,344 | 9/1998 | Balakrishnan | 360/104 |

*Primary Examiner*—Jefferson Evans
*Attorney, Agent, or Firm*—David B. Harrison

[57] ABSTRACT

A head suspension has an integrated multi-layer trace conductor array for supporting and electrically interconnecting a read/write head to electronic circuitry in a disk drive. The electrical micro strip transmission line characteristics of the conductor array is controlled by the selective placement and connection of the trace paths within the multiple layers in order to control and balance electrical parameters including array inductance, inter-trace capacitance, and trace capacitance to a ground plane. The ground plane may further comprise a solid sheet of material or an arrangement of grounded traces disposed in proximity to signal-carrying traces of the micro strip transmission line in order to control and obtain desired electrical characteristics.

15 Claims, 9 Drawing Sheets

MULTI-LAYERED INTEGRATED CONDUCTOR TRACE ARRAY INTERCONNECT STRUCTURE HAVING OPTIMIZED ELECTRICAL PARAMETERS

REFERENCE TO RELATED APPLICATION

This is a continuation-in-part of U.S. patent Application Ser. No. 08/720,833, filed Oct. 3, 1996, now U.S. Pat. No. 5,737,152, the disclosure thereof being incorporated herein by reference.

FIELD OF THE INVENTION

This invention relates generally to structure and method for controlling electrical impedance characteristics of a trace conductor array formed integrally with a flexure of a head suspension assembly. More particularly, the present invention relates to an integrated suspension and trace conductor array interconnect structure wherein the trace conductors are arranged and configured in two or more layers such that mutual coupling between parallel connected conductors is reduced so as to tune and control electrical parameters, particularly inductance and/or capacitance.

BACKGROUND OF THE INVENTION

Contemporary disk drives typically include a rotating rigid storage disk and a head positioner for positioning a data transducer at different radial locations relative to the axis of rotation of the disk, thereby defining numerous concentric data storage tracks on each recording surface of the disk. The head positioner is typically referred to as an actuator. Although numerous actuator structures are known in the art, in-line rotary voice coil actuators are now most frequently employed due to their simplicity, high performance, and their ability to be mass balanced about their axis of rotation, the latter being important for making the actuator less sensitive to perturbations. A closed-loop servo system within the disk drive is conventionally employed to operate the voice coil actuator and thereby position the heads with respect to the disk surface.

An air bearing surface supports a transducer at a small distance away from the surface of the moving medium. Single write/read element designs typically require two wire connections while dual designs having separate reader and writer elements require four wire connections. Magnetoresistive (MR) heads in particular generally require four wires. The combination of an air bearing slider and a read/write transducer is also known as a read/write head or a recording head.

Sliders are generally mounted to a gimbaled flexure structure attached to the distal end of a suspension's load beam structure. A spring biases the load beam and the head towards the disk, while the air pressure beneath the head pushes the head away from the disk. An equilibrium distance defines an "air bearing" and determines the "flying height" of the head. By utilizing an air bearing to support the head away from the disk surface, the head operates in a hydrodynamically lubricated regime at the head/disk interface rather than in a boundary lubricated regime. The air bearing maintains a spacing between the transducer and the medium which reduces transducer efficiency. However, the avoidance of direct contact vastly improves the reliability and useful life of the head and disk components. Demand for increased areal densities may nonetheless require that heads be operated in pseudo contact or even boundary lubricated contact regimes, however.

Currently, flying heights are on the order of 0.5 to 2 microinches. The magnetic storage density increases as the head approaches the storage surface of the disk. Thus, a very low flying height is traded against device reliability over a reasonable service life of the disk drive. At the same time, data transfer rates to and from the storage surface are increasing; and, data rates approaching 200 megabits per second are within practical contemplation.

The disk drive industry has been progressively decreasing the size and mass of the slider structures in order to reduce the moving mass of the actuator assembly and to permit closer operation of the transducer to the disk surface, the former giving rise to improved seek performance and the latter giving rise to improved transducer efficiency that can then be traded for higher areal density. The size (and therefore mass) of a slider is usually characterized with reference to a so-called standard 100% slider ("minislider"). The terms 70%, 50%, and 30% slider ("microslider", "nanoslider", and "picoslider", respectively) therefore refer to more recent low mass sliders that have linear dimensions that are scaled by the applicable percentage relative to the linear dimensions of a standard minislider. Smaller slider structures generally require more compliant gimbals, hence the intrinsic stiffness of the conductor wires attached to the slider can give rise to a significant undesired bias effect.

To reduce the effects of this intrinsic wire stiffness or bias, integrated flexure/conductor structures have been proposed which effectively integrate the wires with an insulating flexible polymeric resinous flexure such that the conductors are exposed at bonding pads positioned at the distal end of the flexure in the proximity of the head. U.S. Pat. No. 5,006,946 to Matsuzaki discloses an example of such a configuration. U.S. Pat. No. 5,491,597 to Bennin et al. discloses a further example in point. While such wiring configurations do enjoy certain performance and assembly advantages, the introduction of the disclosed flexible polymeric resinous material in the flexure and gimbal structure raises a number of challenging design issues. For example, the thermal expansion properties of the resinous material is not the same as the prior art stainless steel structures; and, the long-term durability of such resinous structures, including any requisite adhesive layers, is unknown. Therefore, hybrid stainless steel flexure and conductor structures have been proposed which incorporate most of the benefits of the integrated conductor flex-circuit flexure structures while remaining largely compatible with prior art fabrication and load beam attachment methods. Such hybrid designs typically employ stainless steel flexures having deposited insulating and conductive trace layers for electrical interconnection of the head to the associated drive electronics, e.g., a proximately located preamplifier chip and downstream read channel circuitry typically carried on a circuit board (along with other circuitry) attached to the head/disk assembly.

As taught by U.S. Pat. No. 5,491,597 to Bennin et al., entitled: "Gimbal Flexure and Electrical Interconnect Assembly", the disclosed prior approach called for use of a spring material for the conductive trace layers, such as beryllium-copper alloy, which admittedly has higher electrical resistance than pure annealed copper, for example. On the other hand, pure annealed copper, while a satisfactory electrical conductor at high frequencies, also manifests high ductility rather than spring-like mechanical resilience, and therefore lacks certain mechanical spring properties desired in the interconnect trace material. Traces formed of pure copper plated or deposited onto e.g. a nickel base layer provide one alternative to the beryllium-copper alloy relied upon by the Bennin et al. approach.

These hybrid flexure designs employ relatively lengthy runs of conductor trace pairs or four-wire sets which extend from bonding pads at the distal, head-mounting end of the flexure to the proximal end of the flexure, to provide a conductive path from the read/write head along the length of the associated suspension structure to the preamplifier or read-channel chip(s). Because the conductor traces are positioned extremely close to, but electrically isolated from, the conductive stainless steel flexure structure which is in turn grounded to the load beam, and because of the relatively high signal rates being transferred, the conductor trace inductance and mutual coupling, as well as conductor trace resistance and trace capacitance to ground, can give rise to unwanted signal reflections, distortion, and inefficient signal/power transfer. The unwanted signal reflections tend to deleteriously affect the performance of the read/write head, interconnect structure, and driver/preamplifier circuit.

Micro strip line technology teaches that the loop and inter-conductor capacitance may be changed by changing the dimensions of and/or spacing between micro strips forming a transmission line. However, in the case of integrated trace array wiring schemes for use with head suspension load beams, the dimensions of the conductors are governed by mechanical constraints including the space available on the flexure for the trace interconnect array, and the trace conductor dimensions cannot be changed very much insofar as impedance matching or tuning is concerned.

While the Bennin et al. '597 patent discussed above includes an embodiment of FIGS. 6–8 calling for stacking of traces to form a multi-level array of trace sets, there is no teaching of using conductor traces arranged in multi-level arrays in order to obtain desired electrical parameters, such as capacitance and/or inductance, for example.

The invention to be described provides, inter alia, an interconnect structure for a suspension in a disk drive which includes a multiple layered integrated conductor array having reduced resistance and controllably tuned inductance and capacitance parameters in order to improve trace array electrical performance.

SUMMARY OF THE INVENTION WITH OBJECTS

A general object of the present invention is to provide a low-profile, robust and reliable high performance suspension assembly having a multi-layered integral conductor trace array for electrically interconnecting a read/write head to associated read/write circuitry which overcomes limitations and drawbacks of the prior art.

Another general object of the present invention is to provide an integrated suspension and trace conductor interconnect structure having controlled multiple layer trace geometries relative to a ground plane in a manner achieving improved micro-strip signal transmission line characteristics thereby overcoming limitations and drawbacks of the prior art.

A more specific object of the present invention is to provide a method for reducing mutual inductance and overall impedance of an integrated flexure/multi-layered conductor interconnect structure for use with a read/write head in a disk drive.

Still another object of the present invention is to provide an integrated flexure and multi-layer conductor trace array providing separate optimization of capacitance and inductance of the conductors of both the read and the write elements of a dual-element read/write head.

Another object of the present invention is to provide an improved suspension and multi-layer conductor trace array interconnect structure for supporting and electrically connecting to read/write head elements carried on a slider in a hard disk drive.

A suspension assembly in accordance with principles of the present invention includes a flexure having a multiple-layer integrated trace conductor array along the flexure. The multi-layer conductor traces replace prior art discrete twisted wire pairs which would normally extend along the length of the associated suspension. The conductor trace geometry and relative location in a multiple layer trace array relative to the flexure ground plane and to other traces enables control of inter-trace capacitance, balance of trace capacitance to ground, and reduction of trace inductance parameters over other approaches, thereby enabling a particular electrical parameter to be effectively tuned to achieve a desired operating condition. The invention provides improved electrical performance in a multi-layer trace conductor array without materially altering suspension design or adversely affecting the suspension's mechanical performance.

In one preferred form, an integrated flexure/conductor structure supports a read/write head adjacent to a storage medium and electrically interconnects the head to read/write circuitry. In this approach the flexure/conductor structure includes a generally planar conductive flexure member having a gimbal for supporting the read/write head. A first electrical insulation layer is formed on the flexure member. A first electrical trace path is formed on the first electrical insulation layer. A second electrical insulation layer is formed on the first electrical trace path. A second electrical trace path is formed on the second electrical insulation layer. In this approach the second electrical trace path is laterally offset relative to the first electrical trace path in order to control and reduce inter-trace electrode capacitance, while minimizing increase in inductance of the trace array.

In an alternative preferred form, an integrated load beam assembly supports a read/write head/slider assembly adjacent to a storage medium and electrically interconnects the head to read/write circuitry. The load beam assembly comprises a generally planar conductive member extending to proximity of the read/write head/slider assembly; a first electrical insulation layer disposed on the conductive member; at least one electrical trace path disposed on the first electrical insulation layer; and, a ground plane structure connected to the generally planar conductive member and disposed in overlying and surrounding relation, and spaced away from, the at least one electrical trace path to form a multi-layer shielded transmission line structure.

In another preferred form, an integrated flexure/conductor structure supports a read/write head/slider assembly adjacent to a storage medium and electrically interconnects the head to read/write circuitry. In this approach the flexure/conductor structure also comprises a generally planar conductive flexure member having a gimbal for supporting the read/write head/slider assembly. A first electrical insulation layer is formed on the flexure member. First and second electrical trace paths are formed on the first electrical insulation layer. A second electrical insulation layer is formed on the first and second electrical trace paths. Third and fourth electrical trace paths are formed on the second electrical insulation layer. The third and fourth electrical trace paths are laterally offset relative to each other and are longitudinally aligned with and overlying respectively the first and second electrical trace paths; and, the first electrical trace path is connected in parallel with the fourth electrical trace path, and the second electrical trace path is connected in parallel with the third electrical trace path, thereby equalizing trace path capacitance to a ground plane provided by the flexure member.

In a further preferred form, an integrated flexure/conductor structure supports a read/write head/slider assembly adjacent to a storage medium and electrically interconnects the head to read/write circuitry. The flexure/conductor structure comprises a generally planar conductive flexure member having a gimbal for supporting the read/write head/slider assembly. A first electrical insulation layer is disposed on the flexure member. First and second electrical trace paths are disposed on the first electrical insulation layer in a laterally spaced apart relation. A second electrical insulation layer is disposed on the first and second electrical trace paths. Third and fourth electrical trace paths are disposed on the second electrical insulation layer in a laterally spaced apart relation. A third electrical insulation layer is disposed on the third and fourth electrical trace paths. Fifth and sixth electrical trace paths are disposed on the third electrical insulation layer in a laterally spaced apart relation. In this arrangement the first, third and fifth electrical trace paths are longitudinally and laterally aligned relative to each other and are electrically connected in parallel to form a supply path, while the second, fourth and sixth electrical trace paths are longitudinally and laterally aligned relative to each other and are also connected in parallel to form a return path, thereby reducing inductance without substantially increasing inter-electrode capacitance between the supply path and the return path. Other trace paths and layers may be added to this structure in order further to reduce trace array inductance.

These and other objects, advantages, aspects, and features of the present invention will be more fully appreciated and understood upon consideration of the following detailed description of preferred embodiments presented in conjunction with the accompanying drawings.

BRIEF DESCRIPTION OF THE DRAWINGS

In the Drawings:

FIG. 3D is a greatly enlarged view in elevation and cross section of an alternative arrangement to the arrangement of trace conductors shown in FIG. 3B.

DETAILED DESCRIPTION OF PREFERRED EMBODIMENTS

Figure 1:
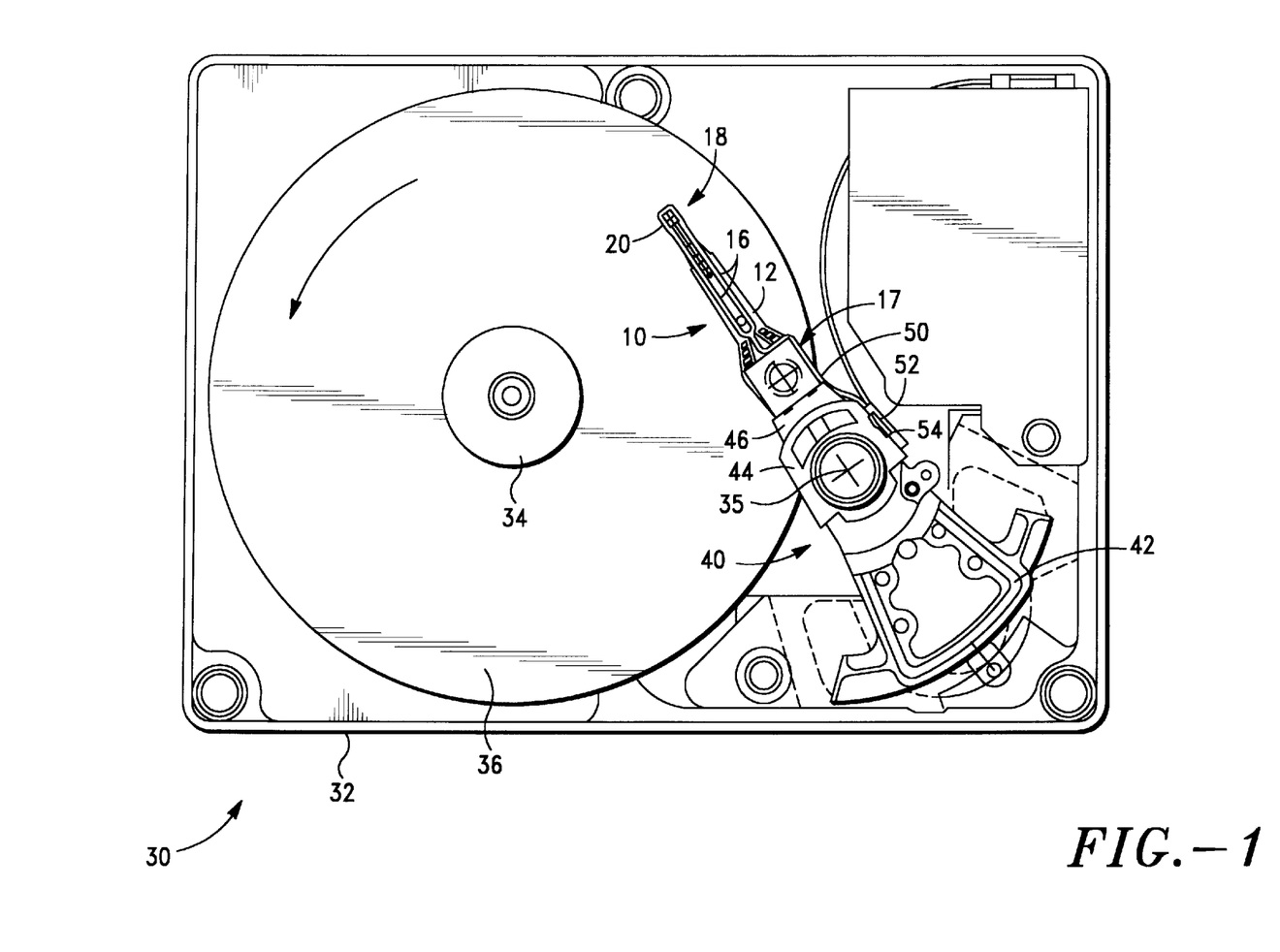
FIG. 1 is an enlarged, diagrammatic plan view of a disk drive including a suspension assembly having a multi-layer conductive trace array incorporating principles of the present invention.
Figure 2:
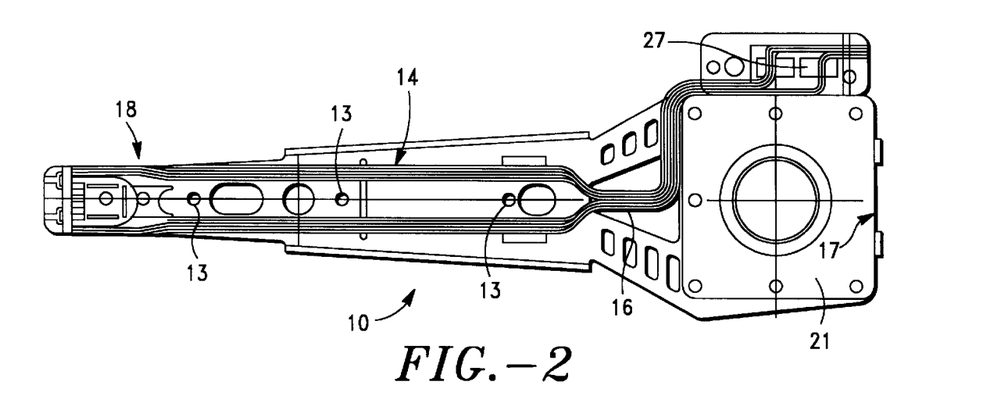
FIG. 2 is an enlarged diagrammatic plan view of an embodiment of integrated flexure/conductor load beam structure having tuned conductive traces in accordance with principles of the present invention.

Referring to the drawings, where like characters designate like or corresponding parts throughout the views, FIG. 1 presents a diagrammatic top plan view of a head/disk assembly (HDA) of a hard disk drive 30. The hard disk drive 30 employs at least one load beam assembly 10 having a flexure 14 including a trace interconnect array 16 as a first preferred embodiment of the present invention. FIG. 1 shows the load beam assembly 10 with the flexure 14 and trace interconnect array 16 employed within its intended operating environment.

In the present example disk drive 30 includes e.g. a rigid base 32 supporting a spindle 34 (and spindle motor, not shown) for rotating at least one storage disk 36 in a direction shown by the curved arrow. Drive 30 also includes a rotary actuator assembly 40 rotationally mounted to the base 32 at a pivot point 35. The actuator assembly 40 includes a voice coil 42 which, when selectively energized by control circuitry (not shown), moves and thereby positions an actuator E-block 44 and head arms 46 (and load beam assemblies 10) at radial track positions defined on the facing surfaces of storage disks 36. At least one of the load beam assemblies 10 is secured at its proximal end 17 to a distal end of a head arm 46, e.g. by conventional ball-swaging techniques.

Conventionally, but not necessarily, two load beam assemblies 10 are attached to head arms 46 between disks 36; and, one load beam structure 10 is attached to head arms above and below the uppermost and lowermost disks of a disk stack comprised of multiple disks 36 spaced apart on spindle 34. The interconnect structure 16 connects to a flexible trace/film segment 50 which extends to a ceramic hybrid circuit substrate 52 secured to a side of the E-block 44. The ceramic hybrid circuit 52 secures and connects a semiconductor chip 54 forming a read preamplifier/write driver circuit. Most preferably, the chip 54 is nested between the ceramic substrate of the hybrid circuit 52 and the E-block sidewall, and is secured to the sidewall by a suitable conductive adhesive or thermal transfer compound such that heat generated during operation of the chip 54 is dissipated into the E-block by conduction, and outwardly into the ambient air volume by convection.

Figure 3:
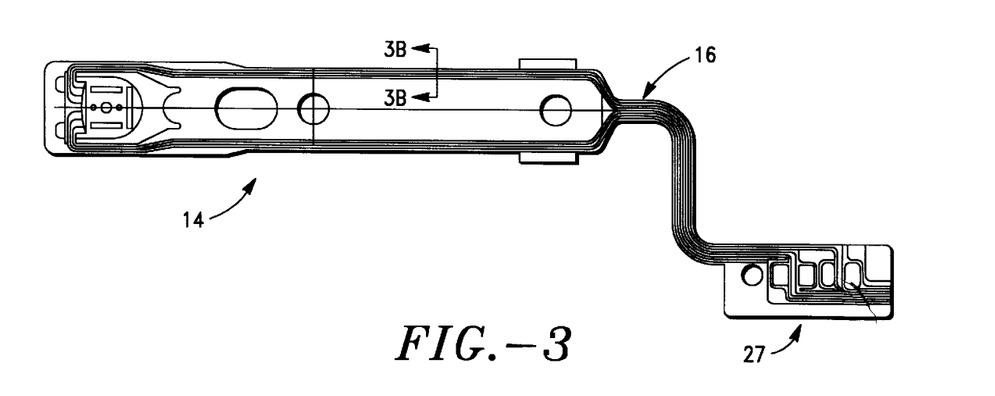
FIG. 3 is an enlarged plan view of a flexure of the FIG. 2 load beam structure having integral wiring incorporating the tuned conductive trace array.
Figure 3A:
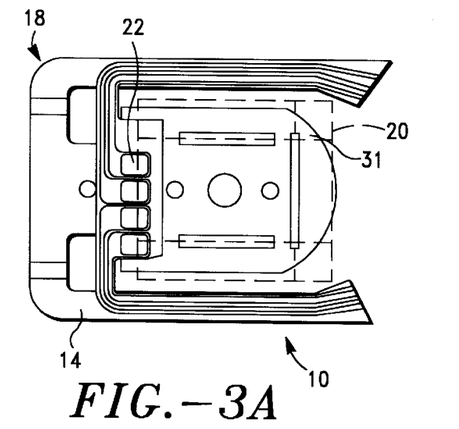
FIG. 3A is a greatly enlarged plan view of a read/write head connection region of the FIG. 3 flexure trace array and wherein the head slider is shown in dashed line outline.
Figure 3B:
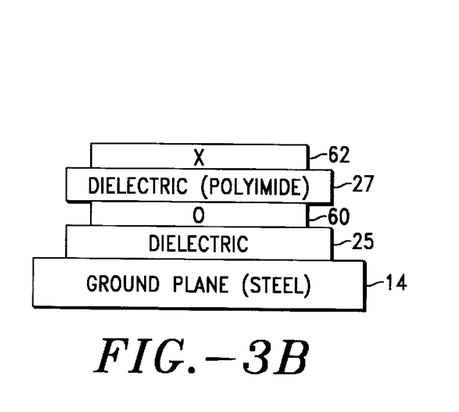
FIG. 3B is a greatly enlarged view in elevation and cross-section taken along section line 3B—3B in FIG. 3.
Figure 3C:
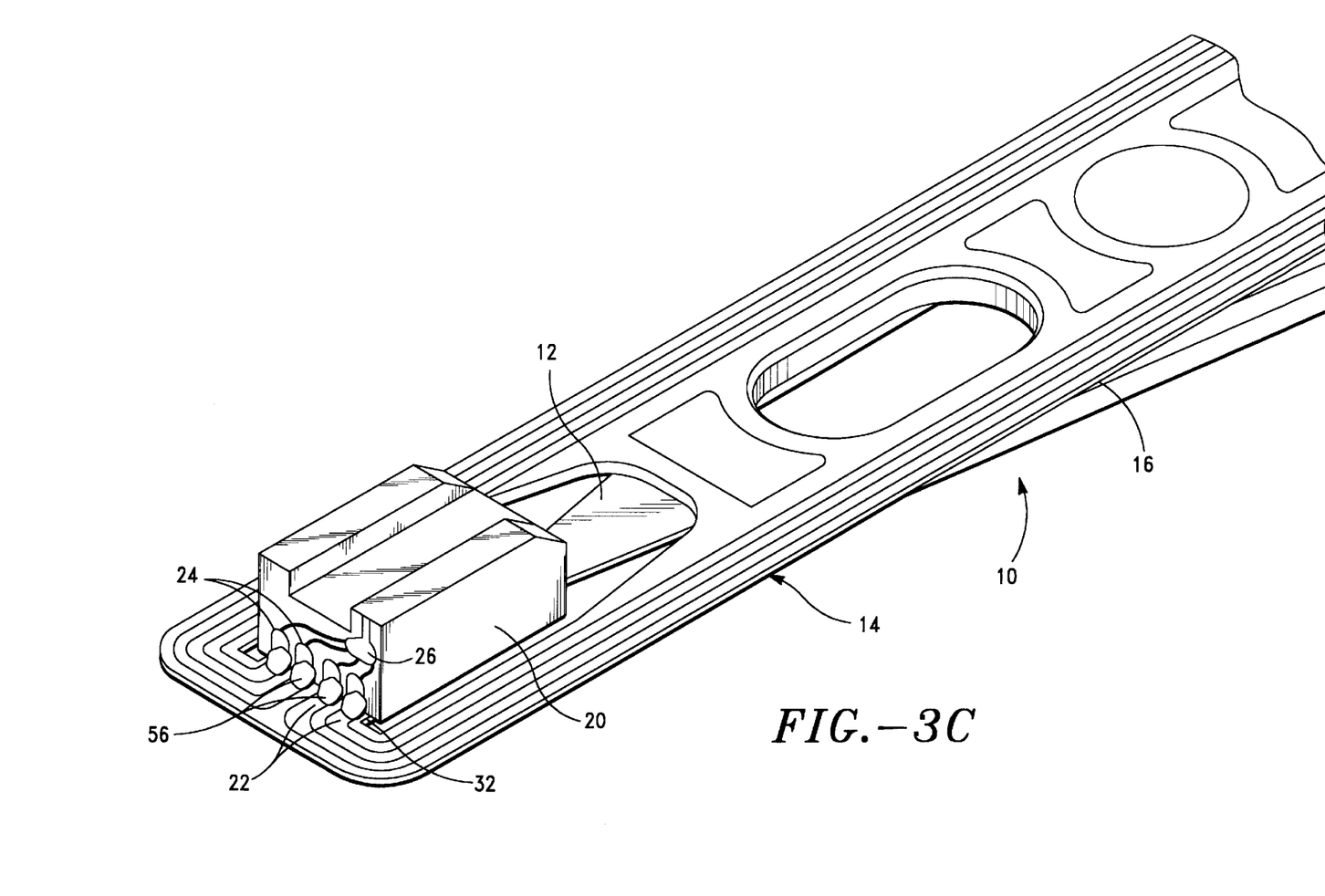
FIG. 3C is a greatly enlarged view in perspective of a slider end of the FIG. 2 load beam structure showing the slider attached to the flexure gimbal, and showing electrical gold ball connections between the flexure trace array and the read/write head connection pads of the slider.

As shown in FIGS. 2, 3, 3A, 3B and 3C, the load beam assembly 10 includes a generally planar formed stainless steel load beam 12 and a flexure 14. In the present example, the flexure 14 is formed of thin stainless steel sheet material which is e.g. approximately 20-microns thick. An array of two pairs of conductive traces 60 and 62 of approximately 10-microns thick copper conductor forms part of an interconnect structure 16 which extends from the proximal end 17 of flexure 14 to another connection pad array 22 located at the slider-supporting distal end 18 of the load beam assembly 10. A transducer head slider 20 is attached to the gimbal 14 by a suitable adhesive at the distal end 18 of the load beam structure 10. As shown in FIG. 3C the connection pads 22 at the distal end 18 are provided for connection by e.g. ultrasonically-wedged gold ball bonds 56 to aligned connection pads 24 of a dual-element (four conductor) thin film magneto-resistive read/write structure 26 formed on a trailing edge of the slider body 20. Preferably, although not necessarily, the slider body 20 is a 30% slider.

Interconnect structure 16 includes a high dielectric polyimide film base 25 interposed between the conductive traces 60 and 62 of the conductor array 16 mounted to the stainless steel flexure 14. The dielectric layer is preferably about 10-microns thick. As shown in FIG. 3D, the flexure 14, in addition to providing a gimbal mounting for the read/write head, may define one or more openings or troughs 28 of controlled width (w) and placement relative to the conductive traces 60 and 62 of the conductor structure 16. These longitudinal openings 28 defined along flexure 14 are arranged and spaced relative to the conductor array 16 in a manner enabling e.g. inductance, capacitance and resistance components of line impedance of the conductor structure to be tuned by varying the width dimension (w) relative to the array 16 as discussed hereinafter in connection with FIGS. 7A, 7B and 7C. Accordingly, the present invention provides a method for tuning and controlling the electrical properties of impedance, including inductance, capacitance and resistance components, of the conductor array 16 arising from integration thereof with the stainless steel flexure 14.

At high data signal frequencies the interconnect structure 16 behaves as a micro strip transmission line for carrying the signals passing between the read/write head and read/write preamplifier/driver chip 54. Accordingly, the geometry of the openings or recesses 28 is also an important factor for controlling impedance along the signal path of trace conductor structure 16.

As shown in FIG. 3B, interconnect array 16 includes, in this embodiment, at least one pair of conductive traces 60 and 62 which are arranged overlay alignment in two layers of the interconnect trace array 16. A first insulating polyimide (a flexible polymeric resinous material) layer 25 isolates the first (inner) trace 60 from the thin stainless steel flexure 14. A second insulating polyimide layer 27 separates and electrically isolates the first trace 60 from a second (outer) trace 62. Although not strictly required, an additional insulation layer of about 4-microns thickness (not shown) may be provided to protect the trace 62. Since the thickness dimension of the dielectric layer 27 between the traces 60 and 62 is on the order of 10 microns in the present example, the inductance is greatly reduced, which may be very desirable, particularly for current carrying trace pairs leading to an inductive write element in the head structure. On the other hand, the FIG. 3B arrangement creates significantly greater inter-trace conductor capacitance levels than present when the traces are arranged in a side-by-side arrangement with e.g. a minimum separation along adjacent trace edges of approximately 10 microns.

Figure 4A:
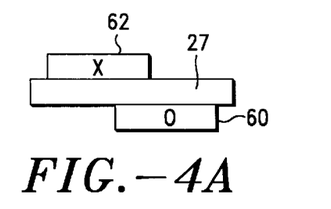
FIG. 4A is a greatly enlarged diagrammatic view in elevation and cross section of an embodiment of the invention alternative to the one shown in FIG. 3B, showing the traces to be laterally offset in order to tune inductance and inter-trace capacitance parameters.
Figure 4B:
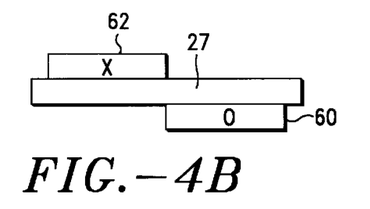
FIG. 4B is a variant trace geometry of the FIG. 4A embodiment, showing the traces fully displaced laterally so that there is no actual overlap between the traces of the plural trace layers.
Figure 4C:
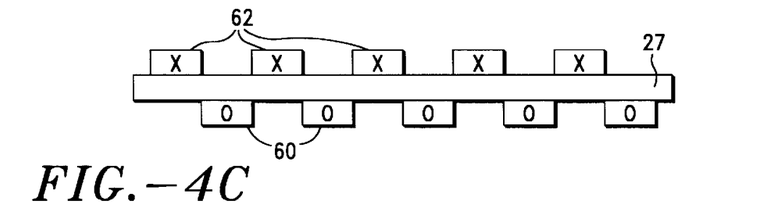
FIG. 4C is an enlarged diagrammatic view in elevation and cross section of another embodiment of the invention which is similar to the embodiment of FIGS. 4A and 4B, with the signal paths being formed as a series of interleaved and offset traces.
Figure 5A:
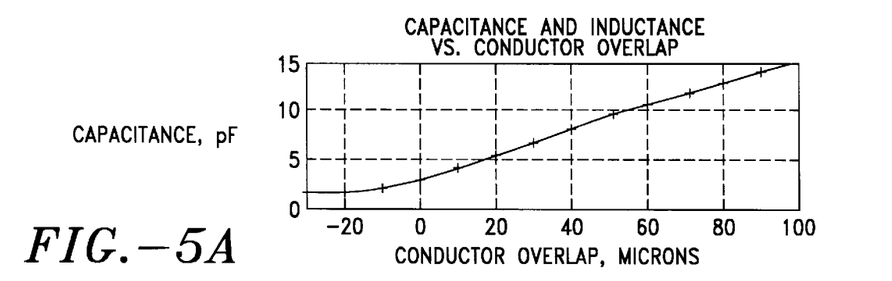
FIG. 5A is a graph of data plotting inter-conductor capacitance as a function of controlled trace overlap as shown in FIGS. 4A and 4B.
Figure 5B:
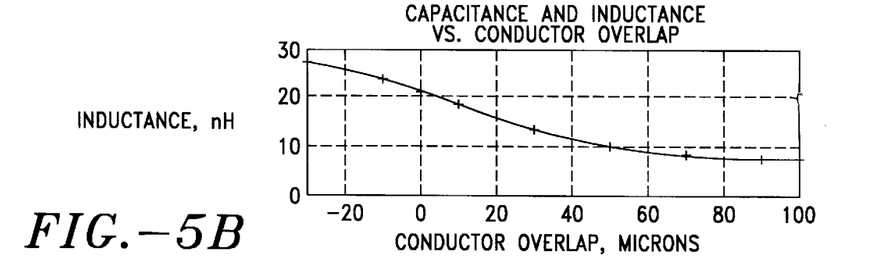
FIG. 5B is a graph of data plotting trace inductance as a function of controlled trace overlap as shown in FIGS. 4A and 4B.
Figure 5C:
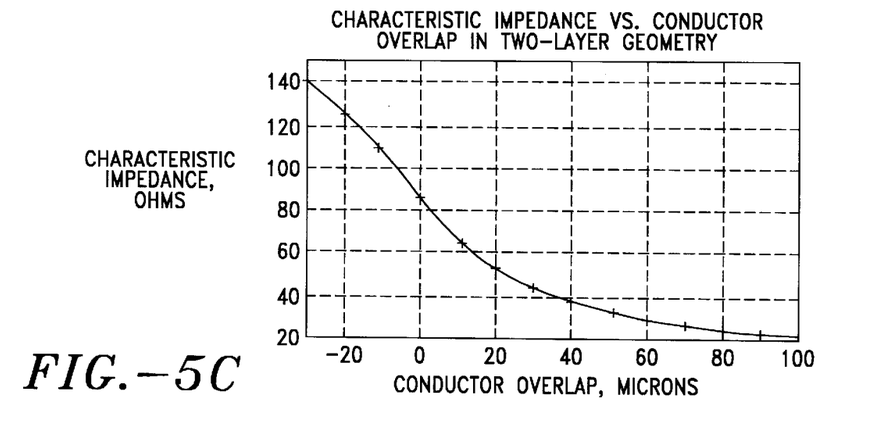
FIG. 5C is a graph of data plotting characteristic impedance of the micro-strip transmission line of FIGS. 4A and 4B as a function of trace conductor overlap in a two-layer geometry.

FIGS. 4A and 4B illustrate a variation upon the FIG. 3B multi-layer arrangement. In FIGS. 4A and 4B, the inner conductor 60 has been laterally displaced to the side of the outer conductor 62. This arrangement controllably reduces inter-trace capacitance. The amount of lateral displacement or offset of the inner trace 60 relative to the outer trace 62 may be used to tune or reduce the inter-trace capacitance in order to reach an acceptable level. In this example, the conductor traces are e.g. 100 microns wide. FIGS. 5A, 5B and 5C present the changes respectively in capacitance, inductance and impedance as a function of overlap, wherein 100 microns represents complete overlap of the traces 60 and 62 as shown in FIG. 3B, and 0 represents complete lateral separation of the traces 60 and 62 as shown in FIG. 4B. Capacitance effects to the flexure 14 are not considered in this present discussion.

Figure 4D:
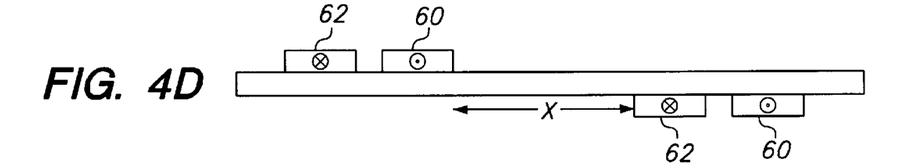
FIG. 4D is an enlarged diagrammatic view in elevation and cross section of another embodiment of the invention, showing the trace conductor signal paths as a series of interleaved and stacked traces.

FIG. 4D illustrates yet another variation of FIGS. 4A and 4B. In 4D, the conductors 60, 62 are interleaved on upper and lower surfaces of the dielectric layer 27. In this configuration, the inner trace conductors 60 are connected in parallel, and similarly, the outer trace conductors 62 are connected in parallel. Additionally, the upper and lower trace conductors are laterally displaced by a distance x. By varying the distance x, the net input inductance and capacitance can be varied.

As can be seen from FIGS. 5A, 5B and 5C, the inductance when the trace conductors overlap completely is about 8 nanoHenrys, which is significantly lower than inductance present the traces of the same dimensions are arranged in a side-by-side arrangement in a single trace layer (14 nanoHenrys). However, the capacitance in the FIG. 3B case is much higher than the inter trace electrode capacitance present in the side-by-side single layer arrangement. By partially overlapping the conductors, an acceptable level of inter-trace capacitance may be obtained while significantly reducing the trace inductance. For example, for 5 pF of capacitance, the inductance from a trace array of the FIG. 4A type having a 20 micron overlap is 14 nH, while in a side-by-side arrangement, the inductance would be 20 nH. Thus, the arrangments of FIGS. 3B, 4A and 4B provide not only very low values of inductance, for a given amount of inter-electrode capacitance, a lower value of inductance is obtained.

Figure 6:
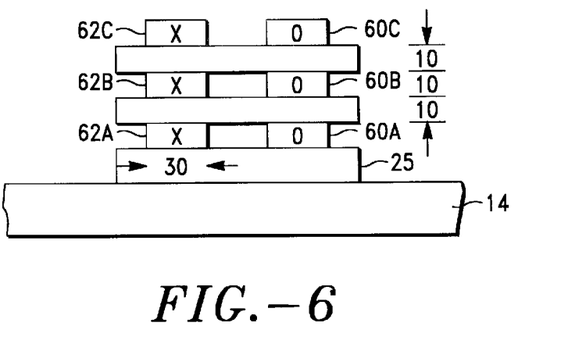
FIG. 6 is a greatly enlarged diagrammatic view in elevation and cross section of another embodiment of the invention alternative to the ones shown in FIG. 3B and FIGS. 4A and 4B. In this embodiment the multiple layers of traces include multiple layers of dielectric films between trace layers.

One way to reduce inter-electrode capacitance even more is shown in FIG. 6. In this embodiment there are three trace layers: a first layer (traces 60A and 62A), a second layer (traces 60B and 62B) and a third layer (traces 60C and 62C), separated respectively from the flexure 14 and from each other by three dielectric layers 25, 27 and 29. The conductors 60A, 60B and 60C of the three layers are connected in parallel, while the conductors 62A, 62B and 62C are also connected in parallel. In this example, the parallel conductors 60A, B and C provide a supply path, whereas the parallel conductors 62A, B and C provide a return path. Since parallel conductors create individual inductance in parallel, the overall inductance is reduced. The arrangement of FIG. 6 may be extended to any number of layers that may be practically formed, given process considerations and manufacturing costs, as well as acceptable mechanical properties in the final load beam/flexure structure.

Figure 7A:
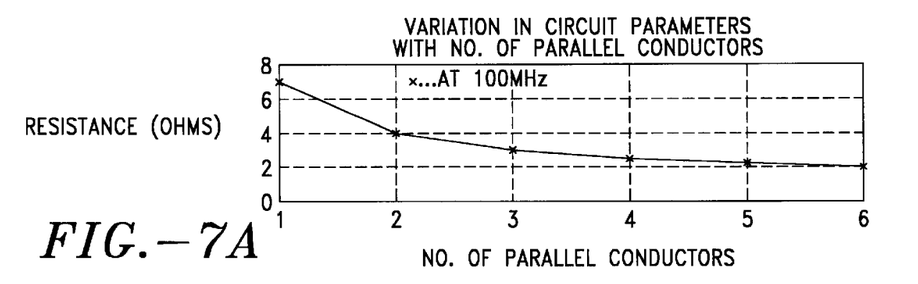
FIG. 7A is a graph of data plotting resistance as a function of the number of parallel trace conductors in a trace array of the type shown in FIG. 6.
Figure 7B:
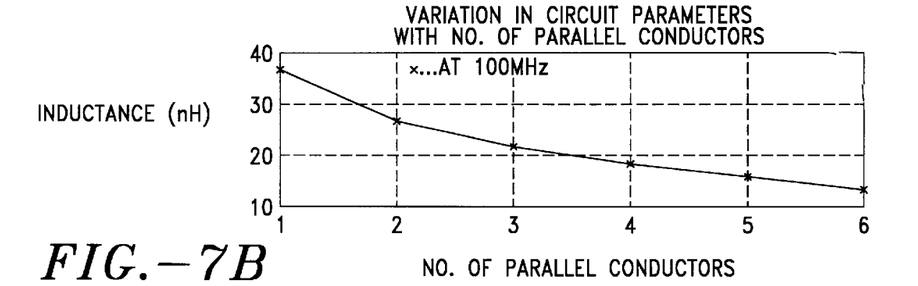
FIG. 7B is a graph of data plotting inductance as a function of the number of parallel trace conductors in a trace array of the type shown in FIG. 6.
Figure 7C:
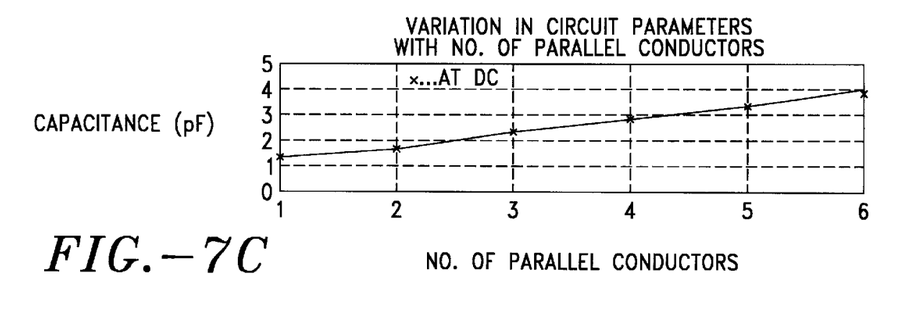
FIG. 7C is a graph of data plotting capacitance as a function of the number of parallel trace conductors in a trace array of the type shown in FIG. 6.

FIGS. 7A, 7B and 7C respectively graph high frequency resistance, inductance and capacitance as a function of the number of trace layers of the array. Even with a six-trace layer configuration of the FIG. 6 type, the capacitance between supply and return path trace conductors is below 5 pF, and the inductance is at 13 nH, wherein the conductive traces are only 30 microns wide. By increasing the width of the individual trace conductors, the inductance can be further reduced, with a nominal increase in inter-conductor capacitance. One difference between the operating conditions of the FIG. 6 trace array and the FIGS. 3B, 4A and 4B trace arrays is that in the FIG. 6 arrangement the currents above and below each dielectric layer are in the same direction, whereas the currents in the FIGS. 3B, 4A and 4B arrays above and below the dielectric layer 27 are in the opposite directions.

The micro-strip configuration 16 shown in FIG. 3B is characterized by low inductance, since the spacing between the current-carrying traces 60 and 62 is a function of the thickness of the dielectric layer 27 separating the layers of traces 60 and 62. Since the traces of FIG. 3B are planar in nature, the illustrated arrangement achieves significant reduction of inductance when compared to a conventional side-by-side trace conductor arrangement. One drawback already mentioned with the FIG. 3B trace array 16 is that the conductive traces 60 and 62 have a capacitance to ground which is a function of the distance of the conductors from the ground plane provided e.g. by flexure 14. (This capacitance is largely removed by removal of flexure material under the conductors and by placement of the conductors in a side-by-side array as described in a related U.S. patent application Ser. No. 08/720,836 filed on Oct. 3, 1996, and entitled "Suspension with Integrated Conductors Having Trimmed Impedance", now abandoned). Since the FIG. 3B trace conductor array has the two conductive traces 60 and 62 in lateral registration with each other, the capacitance to ground of the outer trace 62 is much lower than the capacitance to ground of the inner trace 60. This imbalance in capacitance to ground leads to a serious mismatch between the conductor characteristics when the FIG. 3B configuration is used as a balanced transmission line for a differential circuit.

Figure 8:
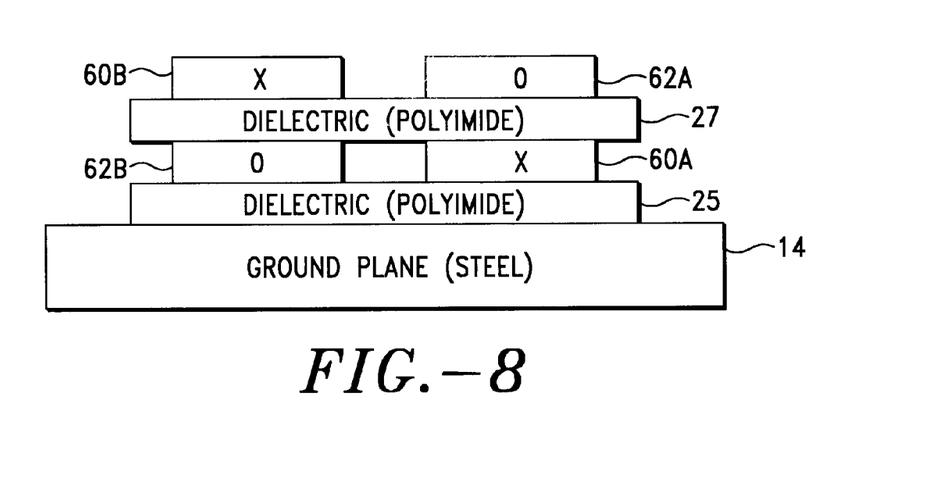
FIG. 8 is a greatly enlarged diagrammatic view in elevation and cross section of a further embodiment of the invention alternative to the embodiments of FIGS. 3B, 4A–B and 6, wherein trace conductor parallel path pairs are laterally spaced and aligned with second parallel path pairs in order to equalize capacitance to the flexure substrate.

The arrangement shown in FIG. 8 provides a multi-layer trace arrangement which eliminates the ground plane capacitance mismatch present in the FIG. 3B array. In the FIG. 8 trace array each conductor 60 and 62 is divided into two trace paths, 60A, 60B and 62A, 62B, there being four trace paths in the array for a signal supply and return circuit (read or write element). Each path 60 and 62 has a trace path (traces 60A and 62B) in an inner layer separated by dielectric layers 25 and 27, and each path also has a trace path (traces 62A and 60B) in an outer layer separated by dielectric layer 27. The net trace capacitance to the ground plane provided by flexure 14 is therefore balanced between the trace paths 60 and 62, and any mismatch due to capacitance to ground is eliminated.

As an example, if the micro-strip configuration of FIG. 3B extends for a length of 57 mm, with conductors that are 60 microns wide, and with the conductive traces 60 and 62 as well as the dielectric layers 25 and 27 all being 10 microns thick, the capacitance to ground for the outer conductive trace 62 is 1.70 pF, while the capacitance to ground for the inner conductive trace 60 is 11.80 pF. When the geometry of FIG. 3B is replaced with the geometry of FIG. 8, and wherein the widths of the trace segments 60A, 60B, 62A, and 62B are 30 microns, and stacked traces 60A and 62A are separated laterally from stacked traces 62B and 60B by 30 microns, and with the same conductor and dielectric layer thicknesses, the capacitance to ground for each conductor 60 and 62 is 8.35 pF. Thus, the FIG. 8 trace array is seen to equalize the capacitance to ground between the supply path 60 and the return path 62. While the FIG. 8 trace array illustrates a single signal loop having a supply and a return path, multiple loops may be obtained by replicating the FIG. 8 array in any desired number of service loop paths.

Figure 9:
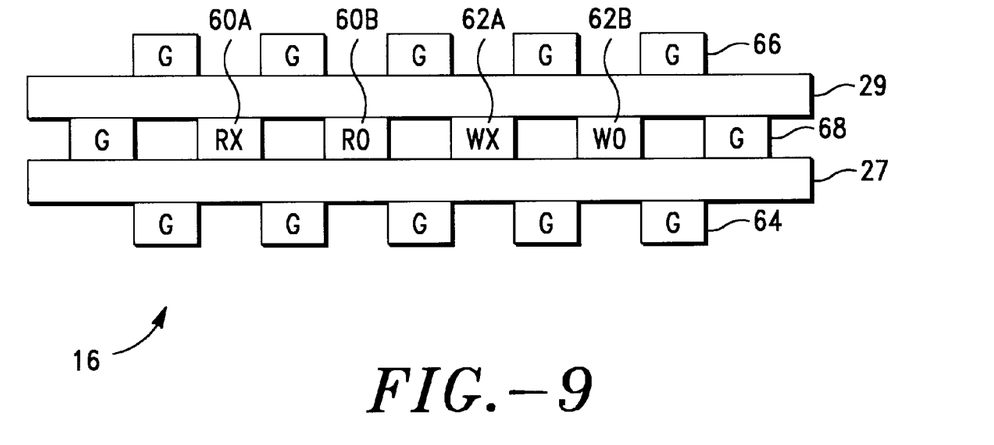
FIG. 9 is a greatly enlarged diagrammatic view in elevation and cross section of yet another self-shielding embodiment of the invention alternative to the one shown in FIG. 3B, wherein the traces are shown in a middle layer of a multiple layer trace array and wherein lower and upper traces form a Faraday (electrostatic) shield around the active service loop trace pairs.

FIG. 9 significantly lowers capacitance of the FIG. 8 structure by dividing the enveloping flexure shield material into trace segments interleaved above and below signal conductor traces and laterally offset from the signal conductor traces, in order to minimize inter-trace capacitance. FIG. 9 shows a trace element array 16B formed as three trace layers separated by two dielectric layers 27 and 29. (The dielectric layer 25 between the flexure 14 and the lowermost or innermost layer is omitted in the FIG. 9 view for simplicity). In the FIG. 9 approach, discrete ground traces 64, 66 and 68 are formed and used, rather than an unbroken conductor sheet in order to reduce capacitance to the service loop pairs 60A–60B, and 62A–62B, and to the ground plane, not shown. Ground trace patterns 64 and 66, respectively below and above, are laterally offset from the service trace pairs 60A–60B and 62A–62B. Ground traces 68 are formed in the same trace layer as the active service trace pairs 60A–60B and 62A–62B.

Figure 10A:
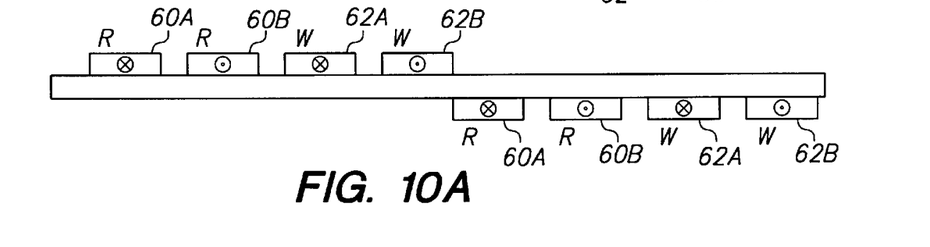
FIG. 10A is another variant trace geometry, showing a multi-layer, interleaved fully displaced layout of trace conductors for a magnetoresistive (MR) head.
Figure 10B:
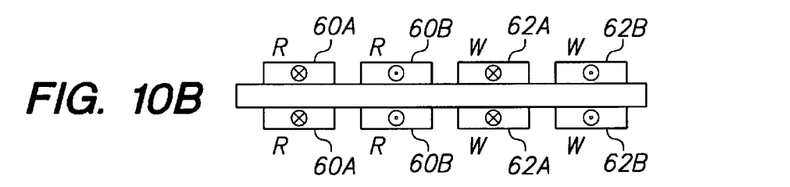
FIG. 10B is another embodiment of the present invention similar to that of FIG. 10A, with the trace conductors arranged interleaved and stacked.

FIGS. 10A and 10B illustrate additional reduced inductance interconnect structure layouts suitable for use with an MR head. FIG. 10A shows conductor trace pairs 60A–60B and 62A–62B stacked on upper and lower surfaces of a dielectric layer 27. In this embodiment, the conductor trace layers are laterally displaced, or staggered, from each other. However, if space is an issue, this displacement can be eliminated such that the trace pairs 60A–60B and 62A–62B are aligned on the upper and lower surfaces of the dielectric layer 27, as shown in the embodiment of FIG. 10B.

Figure 11:
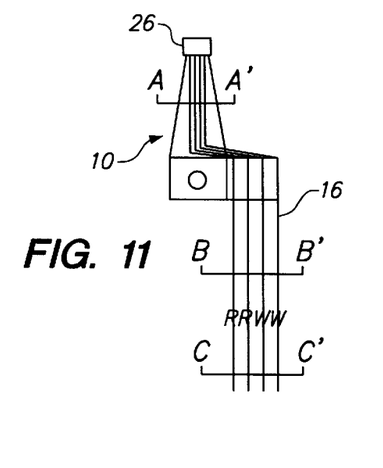
FIG. 11 is a plan view of a flexure having an alternative trace conductor interconnect structure layout according to features of the present invention.
Figure 11A:
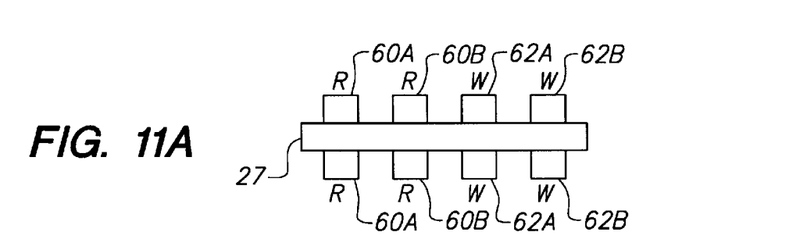
FIG. 11A is a greatly enlarged view in elevation and cross-section taken along section line 11A—11A in FIG. 11.
Figure 11B:
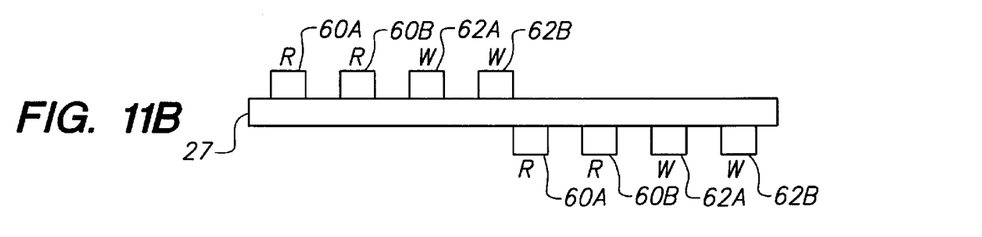
FIG. 11B is a greatly enlarged view in elevation and cross-section taken along section line 11B—11B in FIG. 11.
Figure 11C:
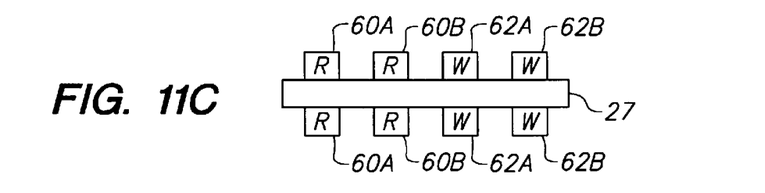
FIG. 11C is a greatly enlarged view in elevation and cross-section taken along section line 11C—11C in FIG. 11.
Figure 12A:
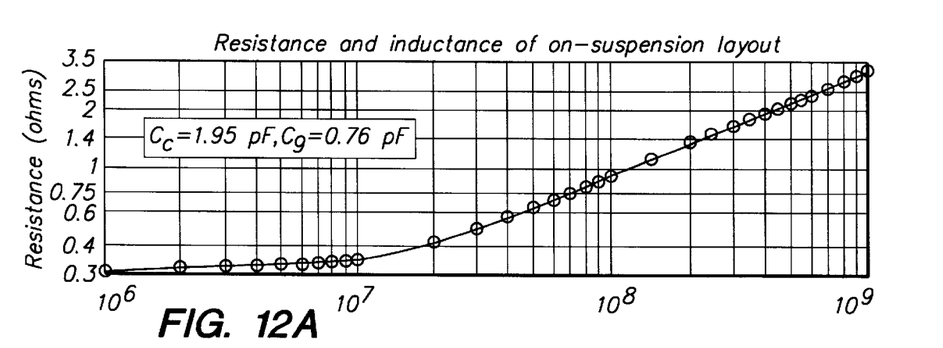
FIGS. 12A and 12B are graphs showing resistance and inductance, respectively, vs. frequency, of the interconnect structure along the load beam suspension assembly.
Figure 12B:
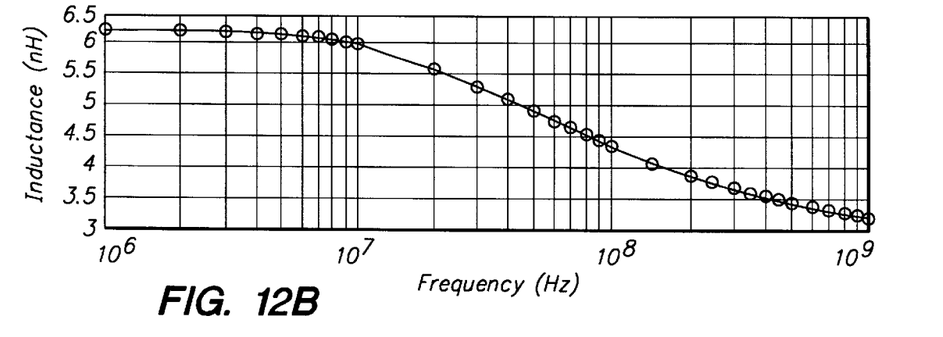
Figure 13A:
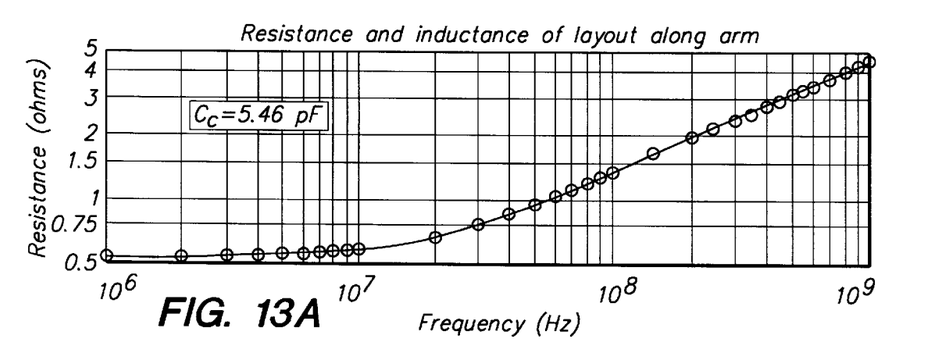
FIGS. 13A and 13B are graphs showing resistance and inductance, respectively, vs. frequency, of the interconnect structure along the arm.
Figure 13B:
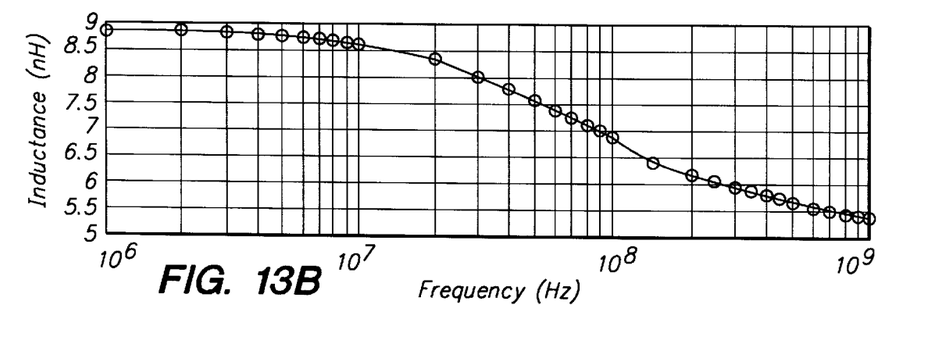
Figure 14A:
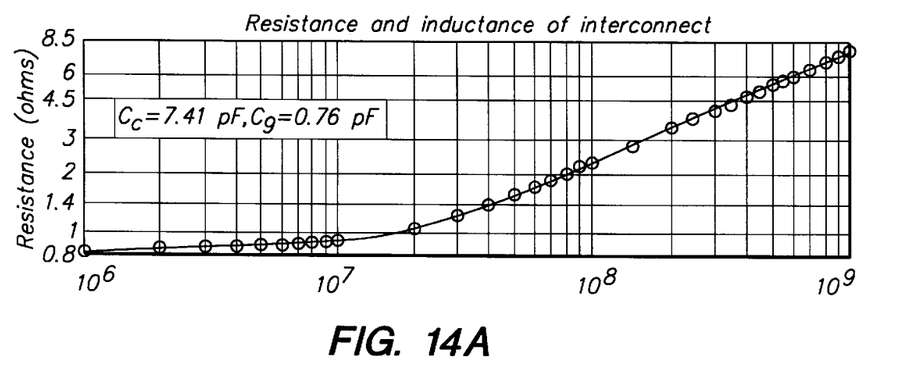
FIGS. 14A and 14B are graphs showing resistance and inductance, respectively, vs. frequency, for the entire interconnect structure.
Figure 14B:
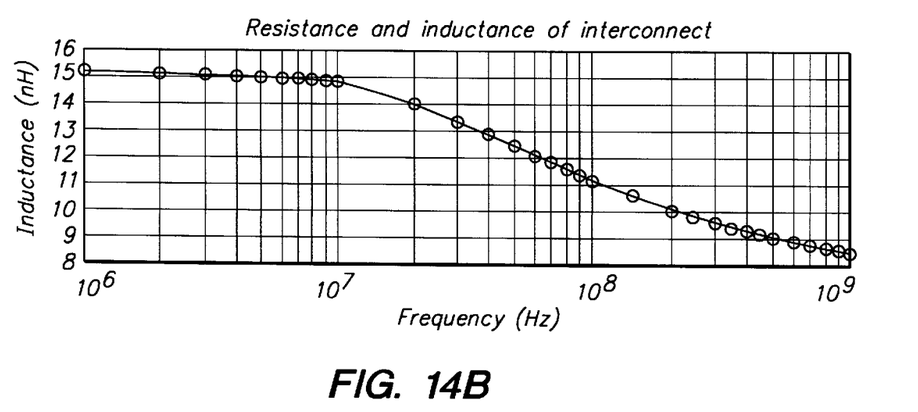

Referring now to FIG. 11, another trace conductor layout for an interconnect structure 16 for use with an MR head is shown. The interconnect structure 16 extends from the preamp circuitry 54, along the periphery of the head arm (not shown), and along the load beam assembly 10 to the head 26. As shown in FIGS. 11A and 11B, the multi-layer trace conductor layout varies at different points along the interconnect structure 16. Along the load beam assembly 10, as shown in FIG. 11A taken at cross-section A—A of FIG. 11, the multi-layer trace conductor pairs 60A–60B and 62A–62B are aligned on the upper and lower surfaces of the dielectric layer 27. Along the head arm section, cross-section B—B of FIG. 11, the multi-layer trace conductor pairs 60A–60B and 62A–62B are laterally staggered on the upper and lower surfaces of the dielectric layer 27. At the preamp 54 end of the interconnect structure 16, the multi-layer trace conductor pairs 60A–60B and 62A–62B are again aligned on the upper and lower surfaces of the dielectric layer 27.

The graphs of FIGS. 12A–14B show the resistance and inductance of the multi-layer trace conductor layout at different points along the interconnect structure 16, in relation to varying frequencies. As seen in the Figures, reduced inductances are obtained for the higher frequencies.

The trace array structure is conventionally formed by any suitable patterning technique, whether by way of photolithography and selective etch, or by selective deposition, lamination or attachment of the conductive traces to the dielectric layers with adhesives, etc.

Those skilled in the art will recognize that, in accordance with the principles of the invention, advanced dual element transducer designs (such as an MR head 26 of FIG. 3C, 10A, 10B and 11) may have the capacitance and/or impedance of the signal paths of the read and write elements separately optimized by employing different conductor geometries and arrangements for the read and write conductive trace array segments, respectively.

Although the present invention has been described in terms of the presently preferred embodiment, i.e., a deposited conductor flexure structure which implements a gimbal, it should be clear to those skilled in the art that the present invention may also be utilized in conjunction with, for example, an integrated gimbal load beam structure, or other conductive suspension members having proximately mounted, deposited, or embedded conductors with or without insulating overcoatings. Thus, it should be understood that the instant disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A multi-layer conductor trace array for electrically interconnecting a magnetic read/write head to read/write circuitry of a magnetic recording and playback device, the multi-layer conductor trace array comprising:

a generally planar support member of flexible material extending for a substantial distance between the read/write head and the read/write circuitry and including a first electrical insulation layer;

a first metal electrical trace path disposed on the first electrical insulation layer;

a second electrical insulation layer disposed on the first electrical trace path;

a second metal electrical trace path disposed on the second electrical insulation layer;

the second metal electrical trace path being aligned with a continuous lateral offset greater than zero determined laterally relative to the first metal electrical trace path along at least a major part of a longitudinal extent of the support member in order to control at least one of inductance, capacitance and alternating current resistance of the multi-layer conductor trace array.

2. The multi-layer conductor trace array set forth in claim 1 wherein the generally planar support member includes a portion comprising a flexure formed of conductive sheet material including a gimbal for positioning a read/write head/slider carrying the read/write head in close proximity to a magnetic disk data storage medium.

3. The multi-layer conductor trace array set forth in claim 1 further comprising a plurality of electrical signal ground trace paths disposed on the first electrical insulation layer, a plurality of electrical signal trace paths disposed on the second electrical insulation layer, the electrical signal trace paths being aligned laterally relative to the electrical signal ground trace paths in order to control at least one of inductance, capacitance and resistance of the multi-layer conductor trace array.

4. The multi-layer conductor trace array set forth in claim 3 further comprising second level electrical signal ground trace paths disposed on the second electrical insulation layer outwardly of the electrical signal trace paths at a distance selected to adjust at least one of inductance, capacitance and resistance of the multi-layer conductor trace array.

5. The multi-layer conductor trace array set forth in claim 1 wherein a third metal electrical trace path is disposed on the first electrical insulation layer outwardly adjacent to the first metal electrical trace path, and a fourth metal electrical trace path is disposed on the second electrical insulation layer outwardly adjacent to the second metal electrical trace path, the third metal electrical trace path being electrically connected in parallel with the second metal electrical trace path, and the fourth metal electrical trace path electrically connected in parallel with the first metal electrical trace path.

6. The multi-layer conductor trace array set forth in claim 1 wherein the continuous lateral offset between the first and second metal electrical trace paths is greater than a transverse trace width of either one of the first and second metal electrical trace paths.

7. An integrated load beam assembly for supporting a read/write head/slider assembly adjacent to a storage medium and for electrically interconnecting the head to read/write circuitry the load beam assembly comprising:

a generally planar conductive member extending to proximity of the read/write head/slider assembly;

a first electrical insulation layer disposed on the conductive member;

first and second electrical trace paths disposed on the first electrical insulation layer;

a second electrical insulation layer disposed on the first and second electrical trace paths;

third and fourth electrical trace paths disposed on the second electrical insulation layer;

the third and fourth electrical trace paths being laterally offset relative to each other and longitudinally aligned with and overlying respectively the first and second electrical trace paths, and the first electrical trace path being connected in parallel with the fourth electrical trace path and the second electrical trace path being connected in parallel with the third electrical trace path, in order to control at least one of inductance, capacitance and resistance of the integrated load beam assembly.

8. An integrated load beam assembly for supporting a read/write head/slider assembly adjacent to a storage medium and for electrically interconnecting the head to read/write circuitry, the load beam assembly comprising:

a generally planar conductive member extending to proximity of the read/write head/slider assembly;

a first electrical insulation layer disposed on the conductive member;

first and second electrical trace paths formed on the first electrical insulation layer in a laterally spaced apart relation;

third and fourth electrical trace paths formed on the second electrical insulation layer in a laterally spaced apart relation;

a third electrical insulation layer formed on the third and fourth electrical trace paths;

fifth and sixth electrical trace paths formed on the third electrical insulation layer in a laterally spaced apart relation;

the first, third and fifth electrical trace paths being longitudinally and laterally aligned relative to each other and connected in parallel, and the second, fourth and sixth electrical trace paths being longitudinally and laterally aligned relative to each other and connected in parallel, in order to control at least one of inductance, capacitance and resistance of the integrated load beam assembly.

9. An integrated load beam assembly for supporting a read/write head/slider assembly adjacent to a storage medium and for electrically interconnecting the head to read/write circuitry, the load beam assembly comprising:

a generally planar conductive member extending to proximity of the read/write head/slider assembly;

a first electrical insulation layer disposed on the conductive member;

a plurality of first electrical signal ground trace paths disposed on the first electrical insulation layer;

a second electrical insulation layer disposed on the plurality of electtrical signal ground trace paths;

a plurality of second electrical signal trace paths disposed on the second electrical insulation layer, the second electrical signal trace paths being aligned laterally relative to the first electrical signal ground trace paths in order to control at least one of inductance capacitance and resistance of the integrated load beam, a third electrical insulation layer disposed on the second electrical signal trace paths, and a plurality of third electrical signal ground trace paths disposed on the third electrical insulation layer, the third electrical signal ground trace paths being aligned laterally relative to the first electrical signal ground trace paths in order to control at least one of inductance, capacitance and resistance of the integrated load beam assembly.

10. An integrated flexure/conductor structure for supporting a read/write head adjacent to a magnetic disk data storage medium and for electrically interconnecting the head to read/write circuitry of a disk drive, the flexure/conductor structure comprising:

a first portion including a generally planar conductive flexure member having a gimbal for supporting the read/write head and a second portion comprising a base of non-conductive substrate material;

a first electrical insulation layer disposed on the flexure member;

a first series of electrical trace paths disposed on the first electrical insulation layer and on the base;

a second electrical insulation layer disposed on the first series of electrical trace paths;

a second series of electrical trace paths disposed on the second electrical insulation layer;

trace paths of the second series of electrical trace paths being electrically connected in parallel with, and laterally offset relative to, trace paths of the first series of electrical trace paths in at least the second portion in order to control at least one of inductance, capacitance and resistance.

11. An integrated flexure/conductor structure for supporting a read/write head/slider assembly adjacent to a storage medium and for electrically interconnecting the head to read/write circuitry, the flexure/conductor structure comprising:

a generally planar conductive flexure member having a gimbal for supporting the read/write head/slider assembly;

a first electrical insulation layer disposed on the flexure member;

first and second electrical trace paths disposed on the first electrical insulation layer, a second electrical insulation layer disposed on the first and second electrical trace paths, third and fourth electrical trace paths disposed on the second electrical insulation layer, the third and fourth electrical trace path being laterally offset relative to each other and being longitudinally aligned with and overlying respectively the first and second electrical trace paths, the first electrical trace path being connected in parallel with the fourth electrical trace path, and the second electrical trace path being connected in parallel with the third electrical trace path.

12. An integrated flexure/conductor structure for supporting a read/write head/slider assembly adjacent to a storage medium and for electrically interconnecting the head to read/write circuitry, the flexure/conductor structure comprising:

a generally planar conductive flexure member having a gimbal for supporting the read/write head/slider assembly;

a first electrical insulation layer disposed on the flexure member;

first and second electrical trace paths disposed on the first electrical insulation layer in a laterally spaced apart relation, a second electrical insulation layer disposed on the first and second electrical trace path, third and fourth electrical trace paths disposed on the second electrical insulation layer in a laterally spaced apart relation, a third electrical insulation layer disposed on the third and fourth electrical trace paths, fifth and sixth electrical trace paths disposed on the third electrical insulation layer in a laterally spaced apart relation, the first, third and fifth electrical trace paths being longitudinally and laterally aligned relative to each other and being connected in parallel, the second, fourth and sixth electrical trace paths being longitudinally and laterally aligned relative to each other and being connected in parallel.

13. A multi-layer conductor trace array for electrically interconnecting a magnetic read/write head to read/write circuitry of a magnetic recording and playback device, the multi-layer conductor trace array comprising:

a generally planar support member having a longitudinal axis and extending for a substantial distance between the read/write head and the read/write circuitry and including a first electrical insulation layer;

a first series of electrical trace paths disposed on the first electrical insulation layer on a first side of the longitudinal axis, a second electrical insulation layer disposed on the first series of electrical trace paths, a second series of electrical trace paths disposed on the second electrical insulation layer on a second side of the longitudinal axis opposite of the first side, the second series of electrical trace paths being aligned with the first series of electrical trace path along at least a major part of a longitudinal extent of the support member in order to control at least one of inductance, capacitance and resistance of the multi-layer conductor trace array.

14. The multi-layer conductor trace array set forth in claim 13 wherein the generally planar support member includes a portion comprising a flexure formed of conductive sheet material including a gimbal for positioning a read/write head/slider assembly carrying the read/write head in close proximity to a magnetic disk data storage medium.

15. The multi-layer conductor trace array set forth in claim 13 wherein the first series of electrical trace paths comprises at least first, second, third and fourth traces, wherein the second series of electrical trace paths comprises at least fifth, sixth, seventh, and eighth traces, and wherein the first and fifth, second and sixth, third and seventh, fourth and eighth traces are respectively electrically connected in parallel to form two write signal paths and two read signal paths.

* * * * *